United States Patent Office 3,453,825
Patented July 8, 1969

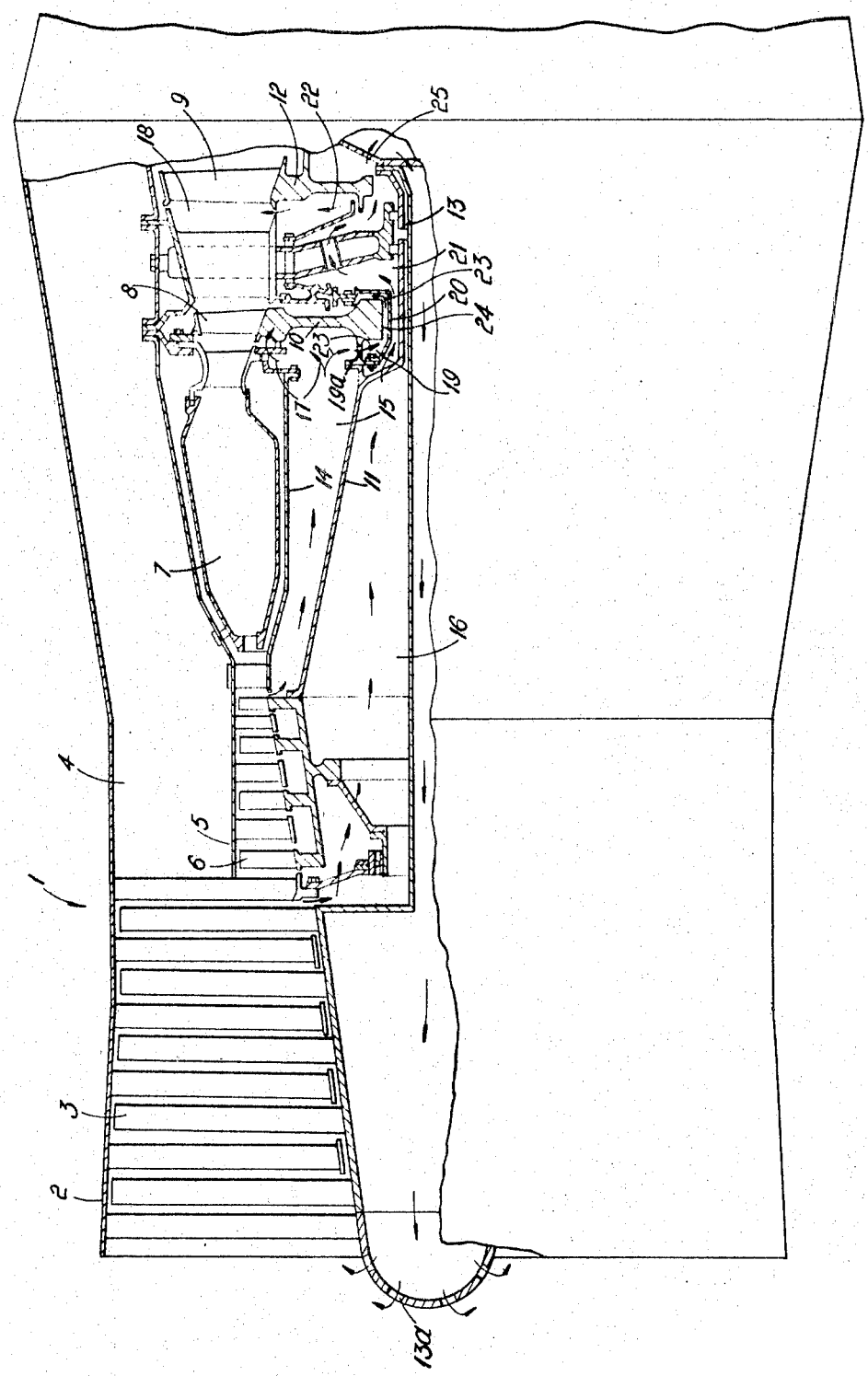

3,453,825
GAS TURBINE ENGINE HAVING TURBINE
DISCS WITH REDUCED TEMPERATURE
DIFFERENTIAL
Gordon Cyril May, Allestree Park, Derby, and Albert James Moreton, Derby, England, assignors to Rolls-Royce Limited, Derby, England, a British company
Filed Apr. 10, 1967, Ser. No. 629,721
Claims priority, application Great Britain, May 4, 1966, 19,802/66
Int. Cl. F02c 7/18, 3/06; F02k 3/04
U.S. Cl. 60—39.09
8 Claims

ABSTRACT OF THE DISCLOSURE

A gas turbine engine has two turbine rotors, the disc of one rotor being supplied with air from a first conduit the disc of the second rotor being separately supplied with air via a second conduit. The first rotor disc has a central bore in which is disposed a cylindrical shield. Both air flows pass through the central bore, and are kept separate by the shield.

---

This invention concerns a gas turbine engine having turbine discs with reduced temperature differential.

According to the present invention, there is provided a gas turbine engine having at least two turbine rotors, a first conduit which supplies relatively hot air to the disc of the first rotor and a second conduit which separately supplies relatively cool air to the disc of at least one other rotor, a central bore extending through the disc of the first rotor and comprising an annular first passage communicating with the first conduit, a second passage disposed within but separate from the first passage and communicating with the second conduit, and a shield rotatable with the first rotor, and separating the first and second passages.

The second passage may also be annular, a shaft which supports the at least one other rotor disc passing through the second passage and defining said passage with the shield.

There may be provided means to withdraw air from the second conduit downstream of the second passage, the shaft being hollow and the withdrawn air being passed through the shaft to heat surfaces at the upstream end of the engine on which in operation, ice may form.

The shield may extend adjacent the other face of the first rotor disc, thus directing air which has flowed through the first passage radially outwardly over the said other face.

Air may be withdrawn from the second conduit and supplied to heat surfaces at the upstream end of the engine on which, in operation, ice may form.

The first rotor disc may be a high pressure turbine rotor disc, the air supplied thereto being bled from a high pressure compressor, the at least one other disc being a low pressure turbine rotor disc, the air supplied thereto being bled from a low pressure compressor.

The invention is illustrated, merely by way of example, in the accompanying diagrammatic drawing, which is a part-sectional view of a portion of a gas turbine engine according to the present invention.

Referring to the drawing, a gas turbine by-pass engine 1 has an outer casing 2 within which is mounted a low pressure compressor 3. The engine 1 has a by-pass passage 4 which receives part of the air compressed by the low pressure compressor 3 and which is defined between the outer casing 2 and an inner casing 5. Mounted in flow series within the inner casing 5 and disposed downstream of the low pressure compressor 3, are a high pressure compressor 6, combustion equipment 7, a high pressure turbine 8 and a low pressure turbine 9.

The high pressure turbine 8 has a turbine disc 10 which is mounted on a shaft 11 on which is also mounted the high pressure compressor 6.

The low pressure turbine 9 has a turbine disc 12 which is carried (via structure not shown) by a shaft 13 which is disposed concentrically within the shaft 11, the shaft 13 driving the low pressure compressor 3.

The combustion equipment 7 is mounted between the casing 5 and a casing 14 which is disposed concentrically therein and which is disposed radially outwardly of the shaft 11. Between the casing 14 and the shaft 11 there is an annular space which forms a cooling air conduit 15, the conduit 15 communicating with the downstream end of the high pressure compressor 6 so as to receive cooling air therefrom.

The shaft 11 is spaced from the shaft 13 by an annular space which forms part of a cooling air conduit 16, the cooling air conduit 16 communicating (by means not shown) with the low pressure compressor 3 so as to receive cooling air therefrom.

It will be appreciated that the flows of cooling air through the conduits 15, 16 will, by reason of their being derived from the high pressure compressor 6 and low pressure compressor 3, be relatively warm and relatively cool respectively.

The cooling air from the conduit 15 is directed against the upstream face of the turbine disc 10 so as to cool the latter. Part of it then flows, as indicated by arrows 17 in a radially outward direction over the turbine disc 10 and is discharged into the main annular flow duct 18 of the engine.

The remainder of the air from the conduit 15 flows radially inwards as indicated by arrows 23 through a passage 19 defined between the turbine disc 10 and a shield 20 carried by the disc, the passage 19 passing through the central bore 24 of the turbine disc 10. The passage 19 communicates with the conduit 15 via apertures 19a and extends adjacent the downstream of the turbine disc 10, so that the air which has passed through the bore 24 then passes radially outwards across the downstream of the turbine disc 10 and exhausts into the main annular flow duct 18 downstream of the turbine 8.

The air from the conduit 15, being bled from the downstream end of the high pressure compressor, is hotter than the walls defining the bore 24 of the disc 10.

The provision of the shield 20 and the flow there through of air from the conduit 15 therefore enables the walls defining the bore 24 to be heated to a temperature which approaches that which exists at the rim of the disc 10 the temperature of the said rim being dictated by virtue of its being attached to the blades of the turbine 8 which are in the hot gas stream of the engine. This arrangement therefore reduces the temperature gradient across the disc 10 and reduces thermal stresses inside the disc 10. If it were not for this arrangement, these thermal stresses might well become such as to approach the limit of the strength of the material used for the disc 10.

The shield 20 also forms the boundary of a conduit 21 which communicates with the conduit 16 so as to receive cooling air therefrom.

The conduit 21 supplies cooling air from the low pressure compressor 3 to the upstream face only of the turbine disc 12 of the low pressure turbine 9. Part of this cooling air, as indicated by arrows 22, flows over the turbine disc 12 in a radially outward direction and is discharged into the main annular flow duct 18 of the engine.

Another part of the cooling air passing through the passage 21 is withdrawn therefrom through apertures 25 in the shaft 13. This cooling air then flows forwardly through the interior of the shaft 13 to heat surfaces (e.g., those of a nose cone 13a) at the upstream end of the engine on which, in operation ice may form.

We claim:

1. A gas turbine engine having at least two turbine rotors, a first conduit which supplies relatively hot air to the disc of the first rotor and a second conduit which separately supplies relatively cool air to the disc of at least one other rotor, a central bore extending through the disc of the first rotor and comprising an annular first passage communicating with the first conduit, a second passage disposed within but separate from the first passage and communicating with the second conduit, and a shield rotatable with the first rotor, and separating the first and second passages.

2. A gas turbine engine as claimed in claim 1 wherein the second passage is also annular, a shaft which supports the at least one other rotor disc passing through the second passage and defining said passage with the shield.

3. A gas turbine engine as claimed in claim 2 comprising means to withdraw air from the second conduit downstream of the second passage, the shaft being hollow and the withdrawn air being passed through the shaft to heat surfaces at the upstream end of the engine on which in operation, ice may form.

4. A gas turbine engine as claimed in claim 1 wherein the shield is cylindrical and is carried by the first rotor disc and extends through the bore thereof, the first passage being defined between the shield and the disc, the interior of the shield defining the second passage.

5. A gas turbine engine as claimed in claim 1 wherein the first conduit delivers air to a face of the first rotor disc, the first passage communicating with the said first conduit to receive therefrom air which has passed radially unwardly over the said face.

6. A gas turbine engine as claimed in claim 5 wherein the shield extends adjacent the other face of the first rotor disc, thus directing air which has flowed through the first passage radially outwardly over the said other face.

7. A gas turbine engine as claimed in claim 1 comprising means for withdrawing air from the second conduit and supplying it to heat surfaces at the upstream end of the engine on which, in operation, ice may form.

8. A gas turbine engine as claimed in claim 1 wherein the first rotor disc is a high pressure turbine rotor disc, a high pressure compressor supplying air thereto and the at least one other disc being a low pressure turbine rotor disc, a low pressure compressor supplying air thereto.

References Cited

UNITED STATES PATENTS

| | | | |
|---|---|---|---|
| 2,563,269 | 8/1951 | Price | 253—39.15 |
| 2,599,470 | 6/1952 | Meyer | 60—39.09 |
| 2,680,001 | 6/1954 | Batt | 253—39.15 |
| 2,951,337 | 9/1960 | Atkinson et al. | 60—39.08 |

CARLTON R. CROYLE, *Primary Examiner.*

A. D. HERRMANN, *Assistant Examiner.*

U.S. Cl. X.R.

60—39.16, 39.66; 253—39.15